United States Patent [19]

Gell, Jr.

[11] Patent Number: 4,771,299

[45] Date of Patent: Sep. 13, 1988

[54] METHOD AND APPARATUS FOR UNDERWATER OPERATION OF NON-WATERPROOF EQUIPMENT

[75] Inventor: Harold A. Gell, Jr., Silver Spring, Md.

[73] Assignee: Sea Fathoms Industries, Silver Spring, Md.

[21] Appl. No.: 113,913

[22] Filed: Oct. 29, 1987

[51] Int. Cl.$^4$ .............................................. G03B 17/08
[52] U.S. Cl. ...................................... 354/64; 114/312
[58] Field of Search ......................... 354/64; 114/312

[56] References Cited

U.S. PATENT DOCUMENTS

| | | | |
|---|---|---|---|
| 1,131,712 | 3/1915 | Klein | 354/64 X |
| 3,162,107 | 12/1964 | Byers | 354/64 |
| 3,717,078 | 2/1973 | Ogura | 354/64 |
| 3,759,605 | 9/1973 | Johnson | 354/64 X |
| 4,281,343 | 7/1981 | Monteiro | 354/64 X |

FOREIGN PATENT DOCUMENTS

| | | | |
|---|---|---|---|
| 2926224 | 1/1980 | Fed. Rep. of Germany | 354/64 |
| 1043770 | 6/1953 | France | 354/64 |

Primary Examiner—Michael L. Gellner
Attorney, Agent, or Firm—Harold Gell

[57] ABSTRACT

A container for adapting a device such as a video camera, camera, strobe light, etc. for underwater operation by providing a flexible, waterproof container and a means to pressurize the container prior to or during immersion. In numerous embodiments, the apparatus includes a pressurizing means responsive to ambient water pressure.

21 Claims, 3 Drawing Sheets

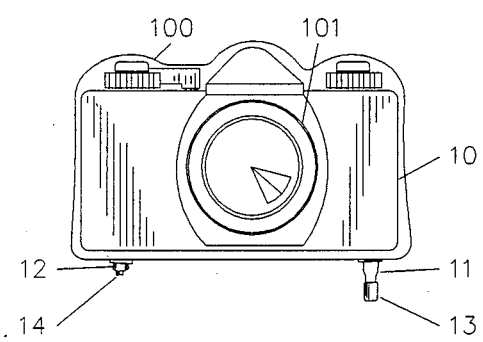
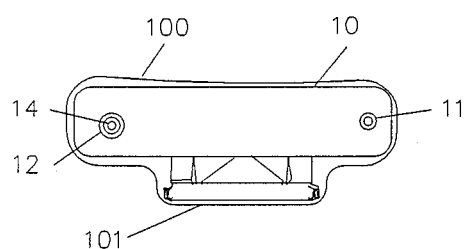
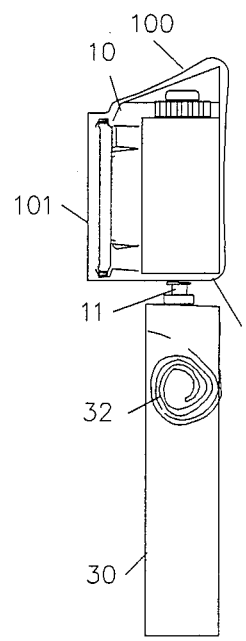
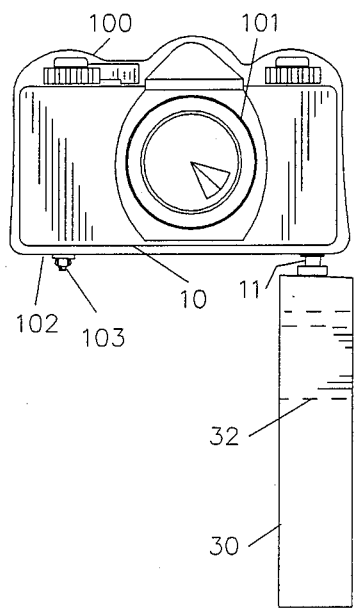
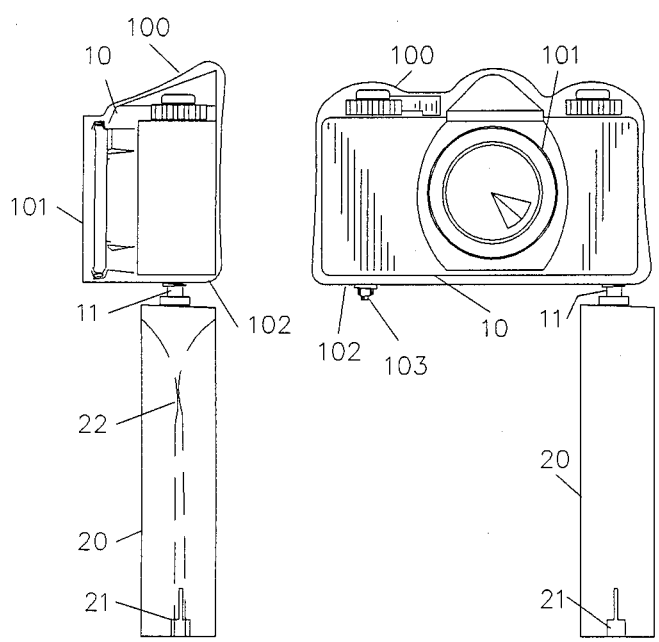
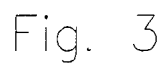
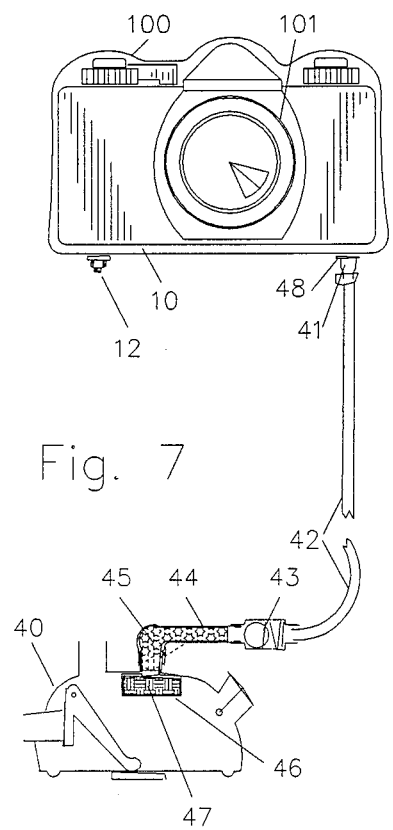

METHOD AND APPARATUS FOR UNDERWATER OPERATION OF NON-WATERPROOF EQUIPMENT

FIELD OF THE INVENTION

The present invention relates to a means to adapt an apparatus such as a video camera, camera, electronic assembly, etc. for underwater operation without increasing the strength of the structure to be protected or adding waterproof seals around openings or operation actuator ports. This is accomplished by waterproofing the device by enclosing it in a flexible, waterproof case and pressurizing the case to approximately equal ambient water pressure.

BACKGROUND OF THE INVENTION

Recent achievements in pressure compensation technology as presented in the co-pending patent application Ser. No. 07/085,336 have made it possible to adapt or produce devices for underwater operation which do not require the use of extensive pressure hulls and high pressure seals. However the devices still require a waterproof construction.

The classical approach for solving the dilemma posed by a need to operate an apparatus underwater when the apparatus is not normally designed for immersion has been the use of a pressure hull. Such devices are bulky, costly and inordinately complex when the device has numerous push-button controls or knobs that have to be activated by an operator. Some attempts have been made to solve this problem by providing a flexible, waterproof container with optical windows when necessary. Thus such devices may be used to encase a video camera, especially the type with push-button controls and the operator may utilize the device underwater. Unfortunately, this approach is severely limited by pressure considerations. At moderate depths, the pressure exerted on the flexible container becomes so great that push-buttons are activated and controls jammed. An even greater problem with this approach is that at moderate depths, the structure of the protected device becomes deformed and in many instances destroyed by the outside water pressure.

Another very serious difficulty encountered by flexible, waterproof containers is that sharp edges of the apparatus contained therein often penetrate the waterproof barrier as the result of external water pressure. Such penetrations allow sea water to enter the container and destroy the apparatus therein.

OBJECTIVES OF THE INVENTION

Considering the vast number of devices which are not waterproof but which could be used advantageously underwater, it is a primary objective of the invention to provide a means whereby any non-waterproof apparatus may be used underwater any depth without changing its physical structure or providing a rigid pressure hull.

It is a primary objective of the present invention to provide a means for pressure compensating the interior of a flexible, waterproof enclosure and the apparatus contained therein to approximate the ambient pressure.

Another objective of the invention is to provide a method for operating a video camera underwater by encasing the video camera in a flexible waterproof container.

A further objective of the invention is to provide a flexible underwater container and means to pressurize the container in response to ambient pressure encountered during a dive.

Another objective of the invention is to provide a collapsible means to effectively increase the internal volume of an underwater flexible container. The collapsible means collapses due to the ambient pressure during a dive and thereby pressurizes the container and extends the operating depth of the device within.

SUMMARY OF THE INVENTION

The present invention contemplates a means to pressurize the interior of a flexible, waterproof container used to waterproof a video camera or any device not designed for underwater operation.

In one embodiment of the invention, a pressurization port of the flexible container is attached to the second stage regulator of the diver operator's scuba system by a one-way valve. This pressurizes the container and its contents to approximate ambient water pressure with each breath the diver takes. Thus pressure throughout the protected is equal to the ambient water pressure and there is no limit to the depth at which the system may operate except for the limitations of the diver.

In another embodiment of the invention, a collapsible air source is attached to the pressurization port of the container to increase its effective interior volume. As the protected device and flexible container are submerged, the air source is collapsed to equalize the pressure within the container. When the air source is completely collapsed, the internal flexible container pressure equals the ambient water pressure. The protected device then has the added depth range equivalent to its basic structural rating.

A still further embodiment is contemplated where the collapsible air source is fabricated from a material which precludes expansion if the body is pressurized but will not interfere with the ready collapse under water pressure. By pressurizing this system, the operating depth of the flexible container can be greatly increased without adding excessive bulk to the air source, the accessory air volume storage means.

In a preferred embodiment, a hollow handle containing an inflatable bladder is secured to the flexible container. The bladder is connected to the flexible container pressurization port to provide a source of pressure equalization gas.

In a still further embodiment, a handle includes a cylinder connected to the pressurization port. The other end of the cylinder is open. A free piston in the cylinder slides in response to the differential pressure between the flexible container and ambient water pressure to equalize the internal pressure during descent or ascent.

In another embodiment, a combined rigid/flexible housing is combined with a pressure equalization means. The flexible panels are positioned to allow operation of the enclosed apparatus and the rigid sections provide protection and mounting means and an unobstructed space for operation of movable items such as automatic telephoto lenses.

DESCRIPTION OF THE DRAWINGS

FIG. 1 is a front view of a camera in a flexible waterproof container illustrating the pressurization and pressure relief valves and optical window.

FIG. 2 is bottom view of a camera illustrating the pressurization valve and optical window.

FIG. 3 is a front view of a camera in a rigid/flexible waterproof container with a collapsible, auxiliary air volume attached.

FIG. 4 is a side view of a camera in a rigid/flexible waterproof container with a collapsible, auxiliary air volume apparatus attached. The dashed lines illustrate the collapsed configuration.

FIG. 5 is a front view of a camera in a flexible waterproof container with a collapsible, auxiliary air volume apparatus attached illustrating in dash line the apparatus collapsed and rolled up.

FIG. 6 is a side view of a camera in a flexible waterproof container with a collapsible, auxiliary air volume apparatus attached illustrating in dash line the apparatus collapsed and rolled up.

FIG. 7 illustrates a flexible waterproof container with a pressurization equalization line attached to the low pressure, second stage regulator of a scuba apparatus.

DESCRIPTION OF THE INVENTION

Figure 8:
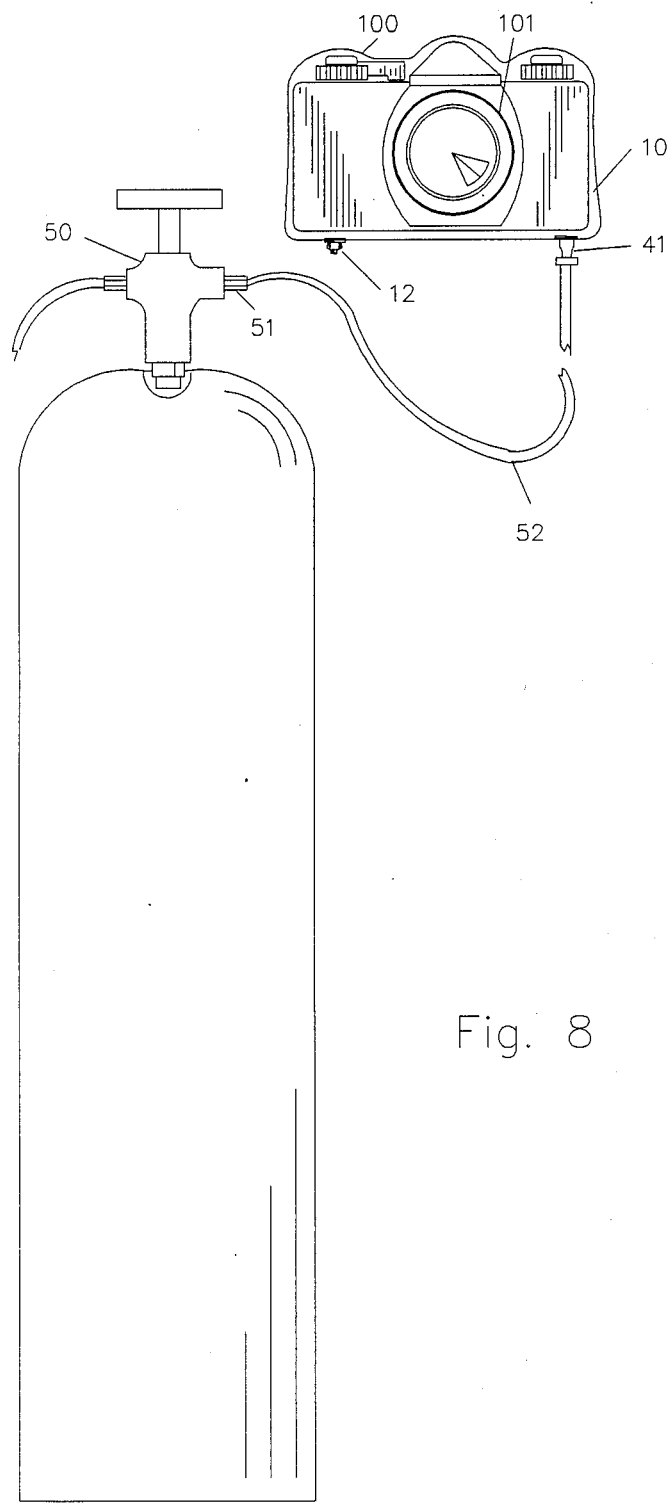
FIG. 8 illustrates a flexible waterproof container with a pressurization line connected to the low pressure output of the first stage regulator of a scuba system.

FIG. 1 illustrates a typical flexible waterproof container with a camera installed. The container 100 includes an optical port 101 and a one-way, pressurization valve 11. This valve may be similar to a common tire valve and its purpose is to allow the container to be pressurized by a simple hand pump or compressed air source. A pressure relief valve 12 is included to prevent over pressurization. The use of a pressure relief valve simplifies pressurization by allowing an operator to apply a compressed air source to pressurization inlet valve 11 until safety valve 12 opens. Cap 13 seals the pressurization inlet valve 11 during dive operations to prevent water from entering the container when the external pressure exceeds the internal pressure.

This system allows operation of the system at greater depths. For instance, consider a system with an operating design depth of one atmosphere or approximately 33 feet. According to this embodiment of the invention, the container may be pressurized to at least that value. Thus the pressure relief valve 12 is set to open at one atmosphere above ambient. The container is pressurized until the relief valve opens to ensure that the internal pressure is one atmosphere above ambient. A protective cap 13 is placed over the pressurization inlet port 11 and the system is ready for underwater operations. When submerged to its normal design limit of 33 feet, the pressure within the container equals the external pressure of one atmosphere greater than sea level so there is no stress on the system. The protected camera may safely be submerged an additional 33 feet which places the camera at its new maximum operating depth which is a real pressure of three atmospheres. However, because the container was pressurized to one atmosphere above sea level ambient pressure, the differential pressure at 66 feet is only two atmospheres and the system is within its operating range.

The safety pressure relief valve 12 may include a manual pressure relief valve 14. This valve allows an operator to manually release the pressure so the container may be opened. In a preferred embodiment, the manual pressure relief valve 14 is recessed and requires a small diameter rod for actuation to preclude inadvertent operation while submerged.

FIG. 2 is a bottom view of the embodiment discussed above.

FIGS. 3 and 4 illustrate an alternate embodiment where a collapsible air bladder 20 is attached to air inlet port 11. Air bladder 20 is more rigid than the flexible material used to produce the container and less rigid than the protected device so it will not start to collapse until the flexible material has been molded around the protected device by external water pressure. The material forming the air bladder has a resistance to deformation from its normal expanded configuration which is less than the pressure required to activate any push-buttons or other movable items on the protected device so that it will collapse to pressurize the flexible container before the walls of the container activate switches due to water pressure molding the container around the apparatus. In this embodiment, the one-way valve within air inlet port 11 is removed to allow the free exchange of pressure between the flexible container 100 and auxiliary air container 20. In this illustrated embodiment, container 100 includes a rigid base 102 secured to the camera by screw 103.

In a typical operation, air bladder 20 has a volume equal to the volume within the container 100. In this system, pressure relief valve 12 is not necessary because the container will never become over pressurized. As the camera 10 is submerged, the flexible container 100 is softly molded about the camera and then bladder 20 collapses to maintain the air pressure within the container 100 equal to the external water pressure. In the exemplary case, the air bladder 20 has a volume equal to the interior of the container 100 less the actual structure of the camera 10, batteries and film. When the camera has been submerged to a depth of 33 feet or one atmosphere, the air bladder 20 is completely collapsed as illustrated by dashed lines in FIG. 4 and the differential pressure between the camera and the water is zero. The camera may now be submerged to a point where the differential pressure between the camera and the exterior equals the structural design limits of the unequalized system. If desired, air bladder 20 may have a volume greater than the air volume of the container 100/camera body to permit even deeper descents. For instance, if the system is fitted with an air bladder 20 having an internal volume equal to four times the internal volume of the container less camera, the camera may be operated at depths as great as 130 feet.

The preceding operations are presented as being exemplary of a system which protects an apparatus that cannot withstand external pressure. If the protected apparatus has a body strength capable of withstanding some external pressure, the benefits of this invention are appropriately increased.

Air bladder 20 may be pressurized through one-way valve 21. This valve is similar to that utilized in the embodiment illustrated in FIG. 1 or it may be a ball inflation valve of the type requiring a hollow needle. Air bladder 20 is fabricated from a material which is reinforced in such a manner that it will readily collapse but will not significantly expand when pressurized.

FIGS. 5 and 6 are front and side views of an embodiment illustrating an auxiliary air chamber 30 which includes a coiling means whereby the container rolls into a coil as it collapses. The inflated configuration of the air container is illustrated by solid lines 30 in the figures and the collapsed, rolled condition is illustrated by dashed lines 32. Container 30 may be used exactly as described for container 20 illustrated in FIGS. 3 and 4.

FIG. 7 illustrates a still further embodiment of the invention. The waterproof container 100 is pneumatically coupled to the second stage regulator 40 of a self-contained underwater breathing apparatus. The air inlet port 41 may be similar to that illustrated in FIGS. 1 through 6 so that the system may operate as illustrated in those embodiments. In the illustrated embodiment of FIG. 7, the air inlet port 41 is a hollow tube to which a heavy walled, small diameter neoprene tubing 42 is sealed to provide a pneumatic conduit to the second stage regulator 40.

The second stage regulator fitting may include a one-way valve 43 which protects the integrity of the breathing apparatus in the event of a malfunction of the camera or if the tube 42 is severed or torn loose. The one-way valve 43 allows air from the low pressure regulator 40 to pass through tubing 42 into the container 100 but prevents water from entering the regulator in the event that tube 42 is removed. The one-way valve is coupled to the second stage regulator 40 via a chamber 44 which may be filled with a desiccant 45 such as silica gel. The chamber is sealed to the second stage regulator and includes an inlet port 46 which contains a gas permeable vapor barrier 47. Air inlet port 46 is larger in diameter than the tubing to accommodate the greater surface area required to allow reasonable free passage of air from the second stage regulator into the conduit to the container via the restriction of the gas permeable vapor barrier 47. This material will allow air to pass into the camera but prevent moisture from entering the system.

If the one-way check valve 43 is used, a pressure relief means is mandatory. It may be a safety valve 12 as illustrated or a simple internal pressure responsive flap.

FIG. 8 is an alternate embodiment usable with containers having a design strength capable of withstanding a pressurization equal to the low pressure output of the first stage regulator of a scuba system. In this embodiment, air line 52 is connected to a low pressure outlet of the first stage regulator 50 in much the same fashion as used to connect buoyancy control devices or second stage regulators to the first stage regulator of a scuba system. A quick release fitting 51 is used so that the operator may disconnect the system in the event of a failure of line 52, pressure relief valve 12 or flexible container to prevent the total loss of air through the resultant open low pressure outlet.

In the embodiments illustrated in FIGS. 7 and 8, the pressure relief valve 12 automatically depressurize the system as the flexible container is raised to the surface. If the embodiment illustrated in FIG. 7 is modified by removing the one-way safety valve 43, the container will automatically depressurize through the second stage regulator and safety valve 12 is not required.

The embodiments illustrated in FIGS. 7 and 8 will allow a diver to take whatever is in the flexible container 100 to any depth at which the diver can survive.

In the embodiment illustrated in FIG. 7, any equipment may be used with comparative safety at any depth to which the diver can survive because the differential pressure between the protected equipment and the ambient water pressure will remain at zero.

Figure 9:
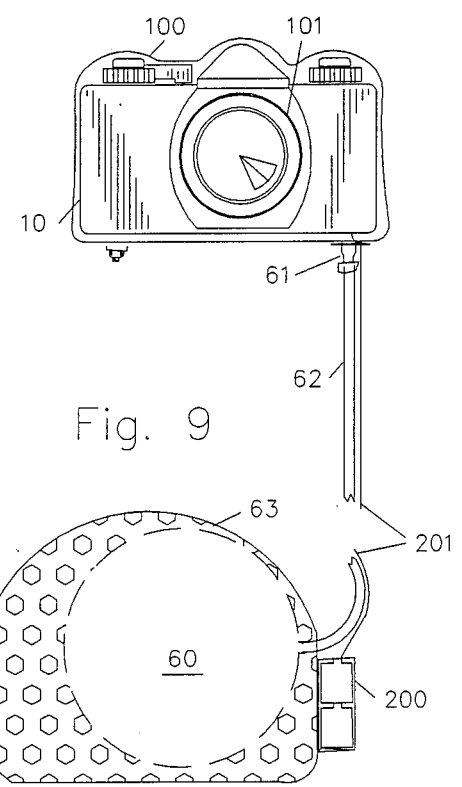
FIG. 9 is a flexible waterproof container with a pressure equalization line connected to a collapsible bladder located in a remote container.

FIG. 9 illustrates an embodiment which includes an air bladder 60 within a container 63 which may be strapped to the diver or the diver's apparatus. The container 63 is preferably a mess bag. The air bladder may be large relative to the container volume less equipment to permit operation at extreme depths. The air bladder 60 is coupled to the container 100 via air line 62 and coupling 61 in a manner similar to that described for the embodiments illustrated in FIGS. 7 and 8. In the embodiment of FIG. 9, a pressure relief valve is not necessary because the system will equalize on descent by the collapse of air bladder 60 and on ascent by the expansion of the air bladder. The relative resiliency of the material forming air bladder 60 meets the requirements set forth for air bladder 20 of FIGS. 3 and 4.

In situations where equipment batteries may leak under pressure, the batteries are enclosed in a separate waterproof housing illustrated as 200 in FIG. 9. The housing 200 may be a pressure hull. The batteries within the housing are electrically connected to the camera by an insulated cable 201. FIG. 9 also illustrates the use of a weight 203 which may be placed in container 63 or attached to air bladder 60 to offset or partially offset the buoyancy of the air bladder. An alternate buoyancy control means is the use of lead shot 204 or other dense, heavy material carried inside the air bladder.

Figure 10:
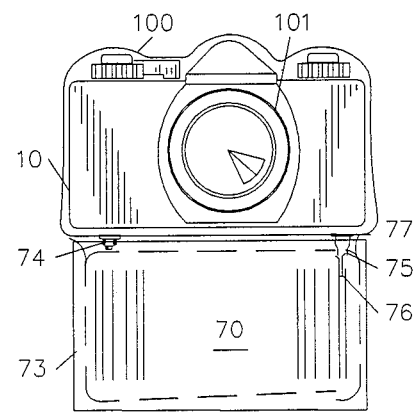
FIG. 10 is a flexible waterproof container with a hollow hand grip containing a collapsible bladder.

FIG. 10 is a further adaptation of the embodiment illustrated in FIG. 9 where the air bladder or bag 70 is shaped in the form of a hollow handle 73. The handle is secured to the camera body by the tripod attachment means 74 through an opening incorporating a seal. In this embodiment, a short air line 77 may be used to couple bladder 70 to the container 100 or the bladder may be an integral part of the flexible container 100. In the embodiment illustrated in FIG. 10, the handle 73 is rigid and secured to the waterproof container. At least one opening 76 is provided in handle 73 to allow water to enter and compress bladder 70. The tripod retaining screw 74 holds the assembly securely to the base of the camera body 10 and bladder 70 is secured to the interior of the handle in the vicinity of the equipment base. A needle valve 75 is incorporated in the container to allow inflation of the system to expand bladder 70 into the handle 73 prior to a dive.

Figure 11:
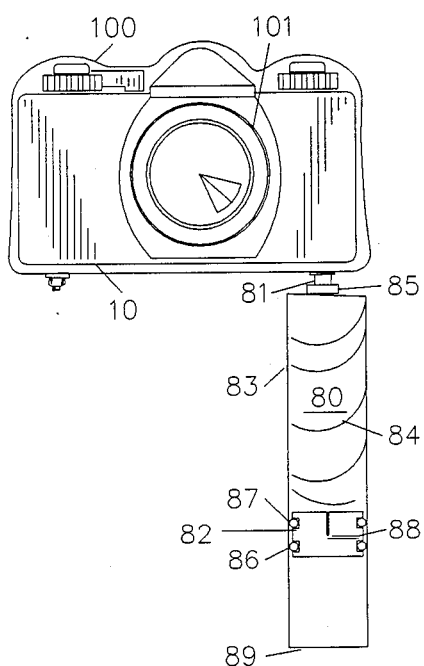
FIG. 11 is an embodiment of the basic invention which includes a pressure responsive pump for pressurizing the container.
Figure 12:
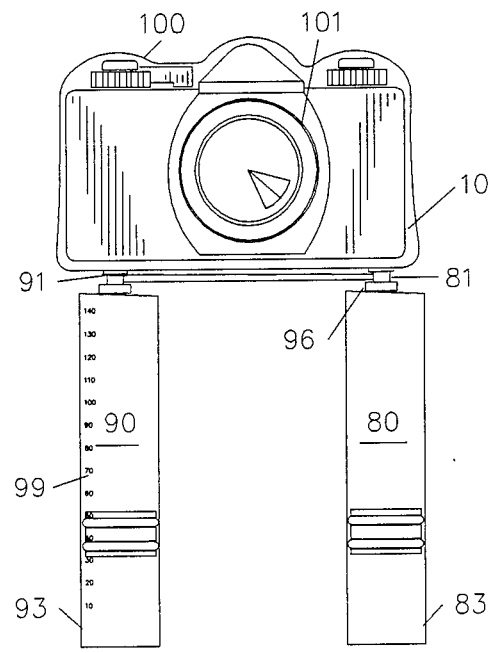
FIG. 12 illustrates the use of a pair of pressure responsive pumps for pressurizing the container.

FIG. 11 illustrates an embodiment of the invention which uses a free piston pump 80 to pressurize the container 100. The pump cylinder is pneumatically coupled to the air inlet 81. The other end, 84, of cylinder 80 is open to the ambient environment and a free piston 82 provides a movable gas tight seal within the cylinder. In operation, the free piston 82 is positioned at the end 89 of the cylindrical chamber 83 to provide a maximum volume between the upper surface of free piston 82 and the inlet port 81. The piston may be manually pushed into the extreme lower position by a rod or light spring 84 or simply by adding air pressure to the outlet port 85 which couples the pump to the container inlet port 81. With the free piston 82 in the extreme down position, the pump 80 is secured to the air inlet port 81 of the container 100. As the assembly is submerged, external water pressure forces the free piston 82 towards the container, forcing air into the waterproof flexible container 100 to equalize the pressure between the equipment and ambient external water pressure. As the assembly ascends, the ambient pressure around the assembly is less than the pressure within the container so the pressure in the container forces the free piston 82 back down the cylinder 83 of the pump 80. The pressure is equalized within the container as the camera descends or ascends by movement of free piston 32. In a preferred application of this embodiment, pump 80 is configured to function as a handle.

The free piston 82 is illustrated sectioned on a plane parallel to and passing through the vertical axis to illustrate the compression "O" ring 86, the stabilizing "O" ring 87, and between ring pressure equalization bore 88.

To increase the operational depth of the assembly, a second pump 90 may be attached as a second hand hold for the container. The second pump 90 functions identically to the first. It may be provided with an independent port 91 into the container 100 or connected via a T connector 96 to the basic inlet port 81.

The cylinders 83 and 93 may be fabricated from any suitable material such as brass or steel but preferably they are fabricated from a transparent plastic so the diver may use the scale 99 as an alternate depth gauge, determine if the piston seals are leaking and ascertain when the maximum equalization depth has been reached.

Figure 13:
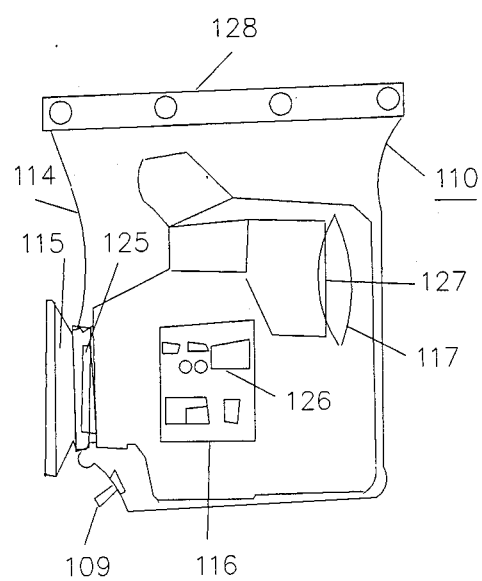
FIG. 13 illustrates a rigid waterproof container for a video camera with flexible operation access panels, rigid means to provide space for lens operation and a pressure compensation port.

FIG. 13 illustrates a television camera within a combined flexible/rigid waterproof container 110. This system includes a flexible container 114 and a rigid optical window section 115 which allows the automatic operation of a zoom lens 125. A soft flexible panel 116 is positioned in the harder flexible container 114 over the control panel 126 to permit free operation of all controls. A second optical window 117 is located in front of the monitor/view system 127 to allow the operator to aim the system and review the tape. Pressure equalization port 109 provides a means for connecting the container to any pressure equalization source. A clamp 128 seals the opening through which the camera is inserted and removed.

While preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim is:

1. An apparatus for adapting a device for underwater operatin, comprising:
    a waterproof container for said device fabricated from a flexible material;
    a collapsible gas container fabricated from a material more rigid than said flexible material but less rigid than the device being protected;
    a pressurization port means for pressurizing said waterproof container; and
    means for connecting said collapsible gas container to said pressurization port, said connection means including a gas passage between the interior of said waterproof container and said collapsible gas container.

2. An apparatus as defined in claim 1, further comprising a safety valve for preventing the pressure within said container from exceeding said container's structural limitations.

3. An apparatus as defined in claim 2 wherein said safety valve includes a pressure release means for equalizing the pressure within said container and the ambient atmosphere.

4. An apparatus as defined in claim 1, further comprising a valve means for allowing the one-way passage of gas into said container.

5. An apparatus as defined in claim 4 wherein said valve is a tire valve.

6. An apparatus as defined in claim 1, wherein said flexible material forming said collapsible gas container has a resistance to deformation which is less than the pressure required to activate any push-button controls on the protected device.

7. An apparatus as defined in claim 1, further comprising means for inflating said collapsible gas container.

8. An apparatus as defined in claim 7 wherein said means for inflating said collapsible gas container comprises a sports ball needle valve and said means for connecting said collapsible gas container to said pressurization port comprises a hollow inflation needle of the type used with sports ball needle valves.

9. An apparatus as defined in claim 1, comprising a weight means to at least partially offset the buoyancy of said collapsible gas container.

10. An apparatus as defined in claim 9, wherein said weight means is a dense material contained within said collapsible gas container.

11. An apparatus as defined in claim 10 wherein said means for inflating said collapsible container is a second sports ball needle valve.

12. An apparatus as defined in claim 1, wherein said collapsible container includes a resilient memory means for rolling said collapsible container in a coil as said container is deflated.

13. An apparatus as defined in claim 1, comprising:
    a pneumatic passage including flexible conduit means for pneumatically connecting said pressurization port means to the second stage regulator of a self-contained underwater breathing apparatus; and a check valve means in said pneumatic passage for preventing water from entering said second stage regulator via said pneumatic passage.

14. An apparatus as defined in claim 1, further comprising a container for said collapsible container.

15. An apparatus as defined in claim 14, further comprising means for securing said container to said containment vessel.

16. An apparatus as defined in claim 15 wherein said container includes a hollow handle means for holding said collapsible container.

17. An apparatus for adapting a device for underwater operation, comprising:
    a waterproof container for said device fabricated from flexible material;
    a pressurization port means for pressurizing said container;
    a pneumatic passage including flexible conduit means for pneumatically connecting said pressurization port means to the second stage regulator of a self-contained underwater breathing apparatus; and said pneumatic passage includes a gas permeable, moisture barrier of the class which will allow air to pass into said passage from said second stage regulator but will prevent water from entering said passage from said second stage regulator.

18. An apparatus as defined in claim 17, further comprising a desiccant chamber for drying gas passing from said second stage regulator to said waterproof container.

19. A method of operating an apparatus underwater, including the steps of:
    placing said apparatus in a flexible waterproof container;
    adding gas to said waterproof container as it is submerged to equalize the pressure between the interior of said waterproof container and the ambient water pressure; and
    providing said gas by collapsing a bladder, fabricated from a material more rigid than said flexible waterproof container, by subjecting it to the ambient water pressure of the waterproof container whereby said ambient water pressure forces gas from said bladder into said waterproof container.

20. An invention as defined in any of claims 1 through 5, 6 through 12, 13 through 16, or 19 wherein said waterproof container is a camera enclosure including an optical port.

21. A method of operating a camera underwater, including the steps of:
    placing said camera in a flexible waterproof container; and
    pressurizing said waterproof container as it is submerged to equalize the pressure between the interior of said waterproof container and the ambient water pressure by collapsing a bladder, fabricated from a material more rigid than said flexible waterproof container, by subjecting it to the ambient water pressure of the waterproof container whereby said ambient water pressure forces gas from said bladder into said waterproof container.

* * * * *